US012695644B2

(12) United States Patent
Ovadia et al.

(10) Patent No.: US 12,695,644 B2
(45) Date of Patent: Jul. 28, 2026

(54) SYSTEM AND METHOD FOR PROVIDING MULTIPLE SERVICE FLOWS TO MULTIPLE SUBSCRIBERS AT THE SAME OR DIFFERENT LOCATIONS

(71) Applicant: Charter Communications Operating, LLC, St. Louis, MO (US)

(72) Inventors: Shlomo Ovadia, Denver, CO (US); K Charles Spahn, Kiowa, CO (US); Charles Ivan Cook, Castle Rock, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 77 days.

(21) Appl. No.: 18/751,207

(22) Filed: Jun. 22, 2024

(65) Prior Publication Data

US 2025/0392493 A1      Dec. 25, 2025

(51) Int. Cl.
*H04L 12/46* (2006.01)
*H04L 12/28* (2006.01)

(52) U.S. Cl.
CPC ...... *H04L 12/4633* (2013.01); *H04L 12/2898* (2013.01); *H04L 12/4641* (2013.01)

(58) Field of Classification Search
None
See application file for complete search history.

(56) References Cited

U.S. PATENT DOCUMENTS

2020/0092253 A1* 3/2020 Gray ................... H04L 41/0806
2020/0213849 A1* 7/2020 Zhao ..................... H04W 12/08

2020/0358878 A1* 11/2020 Bansal ................ H04L 63/0876
2022/0038954 A1* 2/2022 Ovadia .................. H04W 28/10
2022/0124029 A1* 4/2022 Finkelstein ......... H04L 12/4641
2024/0007330 A1* 1/2024 Kim ........................ H04L 45/54
2024/0106696 A1* 3/2024 Ovadia .............. H04L 25/0212
2024/0106701 A1* 3/2024 Malkin .............. H04L 41/0886
2024/0298176 A1* 9/2024 Divvi .................... H04W 12/69
2024/0345821 A1* 10/2024 Rosenbeck .............. G06F 8/65
2025/0240182 A1* 7/2025 Ovadia .............. H04L 12/2801
2025/0323866 A1* 10/2025 Gottlieb ................ H04L 61/256
2025/0350493 A1* 11/2025 Wei ......................... H04L 41/26

OTHER PUBLICATIONS

U.S. Appl. No. 63/643,730, filed May 7, 2024 (Year: 2024).*

* cited by examiner

*Primary Examiner* — June Sison

(74) *Attorney, Agent, or Firm* — The Marbury Law Group, PLLC

(57) ABSTRACT

Systems, methods, and devices for managing multiple service flows through a single Customer Premises Equipment (CPE) device to provide differentiated services to multiple customers, which may be at the same or different locations. A CPE device may be configured to create one or more Virtual Local Area Networks (VLAN) tags within the CPE device, each associated with a specific Service Set Identifier (SSID), which segregates service flows based on customer needs and service types. The CPE device may also generate multiple tunnels from a network gateway to the Wi-Fi routers, with each tunnel corresponding to one of the SSIDs. The tunnels facilitate the segregation of service flows to maintain distinct and independent service streams for different customer segments.

40 Claims, 13 Drawing Sheets

200

500

502 — Initialize System

504 — Detect Connected Devices

506 — Set-up and Establish Service Flows

508 — Set Up and Establish GRE tunnels for each service flow

510 — Configure VLAN tagging per SSID for Wi-Fi Routers

512 — Allocate Network Resources

514 — Monitor and Adjust Configurations

600

602 — Connect At Least One Modem Within The Single CPE Device To At Least One Wi-Fi Router Via At Least One Ethernet Local Area Network (LAN) Port 604 — Create One Or More Virtual Local Area Networks (VLANs) On The Single CPE Device 606 — Generate A Plurality Of Layer 3 Generic Routing Encapsulation (GRE) Tunnels From A Network Gateway To At Least One Wi-Fi Router

700

702 — Monitor Real-Time Service Demands And Network Conditions

704 — Dynamically Update The Network Configuration Based On The Monitoring

706 — Provision New Services Or Adjust Existing Service Flows

800

802 — Configure GRE Tunnels For Specific Data Traffic

804 — Monitor Data Traffic Through The GRE Tunnels

806 — Adjust GRE Tunnel Configurations Based On Traffic Patterns

900

902 — Map Service Flows To Specific SSIDs

904 — Map GRE Tunnels To The Corresponding SSIDs

906 — Handle Different Traffic Priorities Across Wi-Fi Routers At Different Subscriber Locations

1000

1002   Configure The CPE Device With High-Speed Ethernet LAN Ports

1004   Connect The CPE Device To One Or More Wi-Fi Routers Via Separate Ethernet LAN Ports

1006   Configure VLAN Tags And GRE Tunnels To Segregate Service Flows For Different SSIDs

SYSTEM AND METHOD FOR PROVIDING MULTIPLE SERVICE FLOWS TO MULTIPLE SUBSCRIBERS AT THE SAME OR DIFFERENT LOCATIONS

BACKGROUND

The deployment and management of network services face a number of technical challenges in modern networking environments. Typical customer premises equipment (CPE), such as cable modems and routers, facilitate connections between user devices and a service provider network. Recently, CPEs have transitioned from a basic connectivity tool to a complex computing device. Older models often lack the capabilities to support the advanced features demanded by today's customers, necessitating costly and time-consuming equipment replacements and/or upgrades. The process of replacing and/or upgrading equipment has driven the desire for an improved system architecture that facilitates the rapid deployment of new services directly at customer premises without requiring extensive updates to existing hardware or software.

Architectures such as virtual customer premises equipment (vCPE) or network-enhanced residential gateway (NERG) have been developed. These solutions introduce a distributed residential gateway architecture where traditional CPE functions, such as DHCP server and packet filtering, are shared between a bridged residential gateway (BRG) at the customer premises and a broadband network gateway (BNG) at the service provider's network. The distributed residential gateway architecture allows for offloading CPE functions to the BNG and allows the CPE to primarily serve as a simple connectivity device while still delivering the comprehensive and advanced features customers require.

Despite these advancements, integrating advanced network technologies such as virtual local area networks (VLANs) and enhanced security measures remains complex and often requires specialized IT expertise. In addition, related systems generally cannot use a single infrastructure component to deliver multiple types of digital services (e.g., high-speed data, voice over IP (VoIP), video streaming, etc.).

SUMMARY

Various aspects include methods of providing multiple service flows to multiple customers through a single customer premises equipment (CPE) device, which may include connecting at least one modem within the single CPE device to at least one Wi-Fi router via at least one Ethernet local area network (LAN) port, creating one or more virtual local area network (VLAN) tags on the single CPE device, in which each of the one or more VLAN tags segregates multiple service flows and may be associated with one or more service set identifiers (SSIDs), and generating a plurality of tunnels from a network gateway to the at least one Wi-Fi router, in which each of the generated plurality of tunnels may be associated with the one or more SSIDs and segregates service flows according to customer segments.

In some aspects, dynamically updating the network configuration further may include provisioning new services, adjusting service flows, or updating tunnel settings. In some aspects, dynamically updating the network configuration may include dynamically updating a modem configuration or a Wi-Fi router configuration. In some aspects, dynamically updating the network configuration may include updating at least one of the segregated service flows to accommodate changes in customer demands or network conditions.

In some aspects, each of the generated plurality of tunnels may be a Layer 3 generic routing encapsulation (GRE) tunnel configured to manage specific data traffic designated to separate customer segments. Some aspects may further include repeatedly monitoring and adjusting data flows through the VLAN tags and tunnels. Some aspects may further include mapping the service flows and tunnels to the SSIDs of one or more different Wi-Fi routers. In some aspects, the network gateway may include at least one of a Wi-Fi access gateway (WAG) and a Broadband network gateway (BNG). In some aspects, the CPE device may include at least one of a passive optical network (PON), a D4.0/D3.1 residential embedded multimedia terminal adapter (eMTA), a D4.0/D3.1 small and medium business (SMB) eMTA, a wireless gateway, or a $\frac{1}{10}$ G Ethernet passive optical network (EPON) optical network unit (ONU).

Some aspects may further include connecting the CPE device to two or more Wi-Fi routers via separate Ethernet LAN ports configured to support various throughput capacities to allow for the delivery of separate sets of services through different VLANs associated with different SSIDs.

In some aspects, generating the plurality of tunnels from the network gateway to the at least one Wi-Fi router may include generating at least one tunnel from the network gateway to a first Wi-Fi router located at a first geographical location, and generating at least one tunnel from the network gateway to a second Wi-Fi router located at a second geographical location, in which the second geographical location may be different from the first geographical location.

In some aspects, generating the plurality of tunnels from the network gateway to the at least one Wi-Fi router may include generating at least one tunnel from the network gateway to a first Wi-Fi router located at a first geographical location, and generating at least one tunnel from the network gateway to a second Wi-Fi router located at a second geographical location, in which the second geographical location may be the same as the first geographical location.

Further aspects may include a computing device (e.g., a CPE device, etc.) having a processor configured with processor-executable instructions to perform various operations corresponding to the methods discussed above. Further aspects may include a computing device having various means for performing functions corresponding to the method operations discussed above. Further aspects may include a non-transitory processor-readable storage medium having stored thereon processor-executable instructions configured to cause a processor to perform various operations corresponding to the above-mentioned method operations.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Figure 1A:
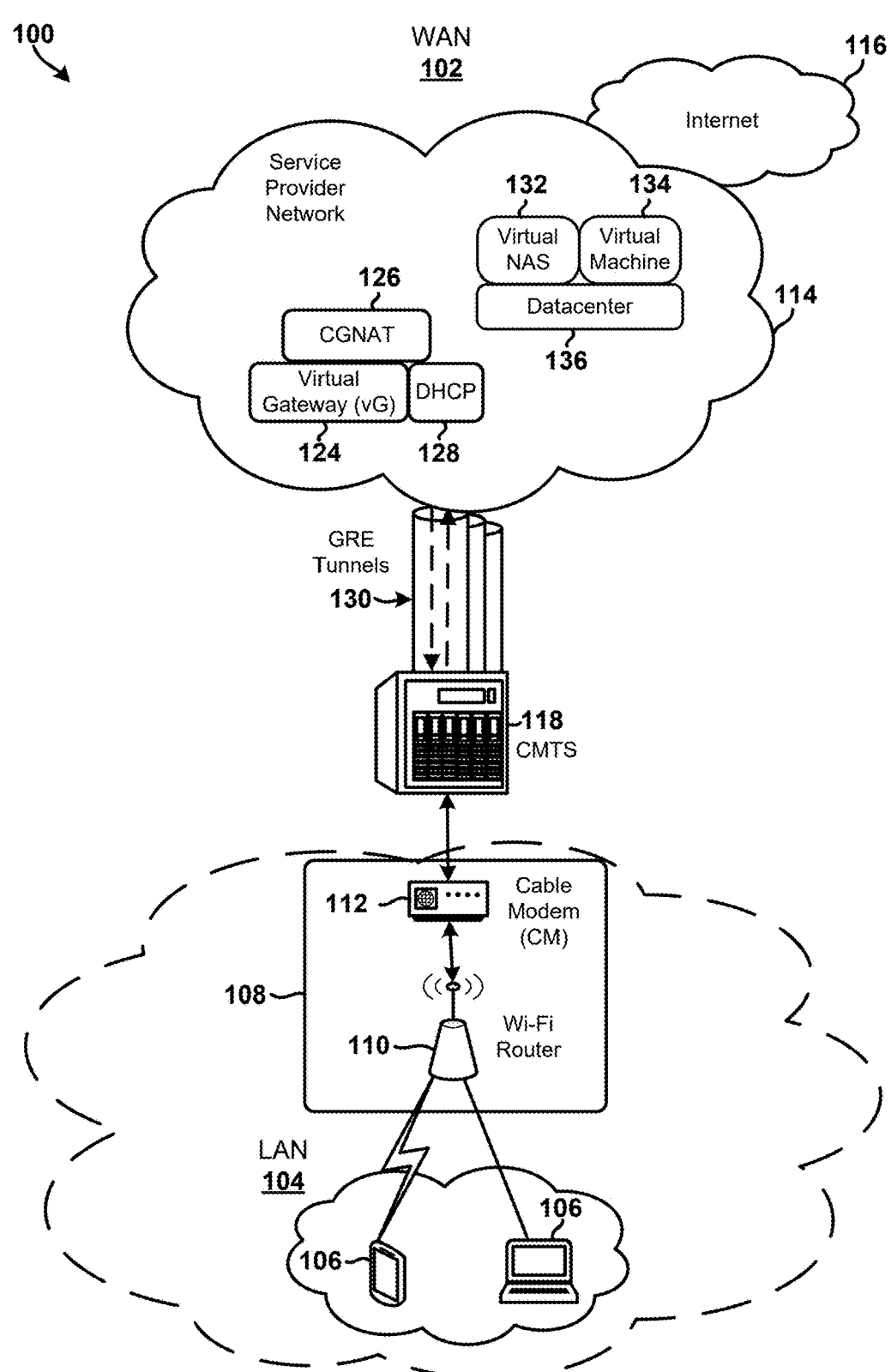
FIGS. 1A and 1B are block diagrams of example networks that are suitable for implementing some embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

In overview, the various embodiments include methods (and computing systems configured to implement the methods) of delivering multiple service flows to multiple customers using a single Customer Premises Equipment (CPE) device. The various embodiment methods may include configuring the CPE device to support separate virtual local area networks (VLANs) and tunnels (e.g., Layer 2 VLAN tunnels, Layer 3 Generic Routing Encapsulation (GRE) tunnels, etc.) for each service line so that traffic for different services remains segregated and managed effectively. For example, an embodiment method may include connecting one or more modem(s) (e.g., ONUs, etc.) within a single CPE device to one or more Wi-Fi router(s) via Ethernet local area network (LAN) ports of varying capacities, establishing VLANs to segregate service flows across service set identifiers (SSIDs) tailored for different user profiles (e.g., private primary, private secondary, mobile services, etc.) and creating multiple tunnels from a network gateway to the Wi-Fi router(s). The modem(s) may be located at a single location while the Wi-Fi routers may be located at the same or different locations.

Some embodiments may use the tunnels to generate distinct and segregated service flows. In some embodiments, each tunnel may be configured to manage specific data traffic for different customer segments and use traffic management protocols to continuously monitor and adjust the data flow through the VLANs and tunnels. In some embodiments, the methods may include dynamically updating specific service flows and/or modifying network component configurations (e.g., modifications to the modem or Wi-Fi router configurations).

In some embodiments, the network gateway may include a Wi-Fi access gateway (WAG) and a broadband network gateway (BNG). The CPE device may include, for example, a D4.0/D3.1 residential multimedia terminal adapter (eMTA), a D4.0/D3.1 small and medium business (SMB) eMTA, an advanced wireless gateway, or a ¹⁄₁₀ G ethernet passive optical network (EPON) optical network unit (ONU). In some embodiments, the CPE may be connected to two Wi-Fi routers via separate Ethernet LAN ports capable of supporting at least 10 G/2.5 Gbps. This may allow for the delivery of distinct services through different VLANs associated with specific SSIDs.

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000TM), enhanced data rates for GSM evolution, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies includes, for example, the transmission and reception of data, signaling and/or content messages.

Any references to terminology and/or technical details related to an individual wired or wireless communications standard or technology are for illustrative purposes only, and not intended to limit the scope of the claims to a particular communication system or technology unless specifically recited in the claim language.

The term "user equipment (UE)" may be used herein to refer to any one or all of satellite or cable set top boxes, laptop computers, rack mounted computers, routers, cellular telephones, smart phones, personal or mobile multi-media players, personal data assistants (PDAs), customer-premises equipment (CPE), personal computers, tablet computers, smart books, palm-top computers, desk-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution, and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process-related communication methodologies.

The terms "service line" and "service flow" are used herein to refer to a MAC layer transport service that provides unidirectional transport of packets from the upper layer service entity to the radio frequency (RF) interface. These terms may specifically relate to the shaping, policing, and prioritizing of traffic according to QoS traffic parameters defined for each flow. For example, these terms may refer to the managed segments of network traffic within a single CPE device setup that are each tailored to deliver specific types of services (e.g., primary services, secondary services, etc.).

The term "tunnel" may be used herein to refer to a communication pathway established between network devices that encapsulates packets for transmission over a network. Tunnels may be implemented using various Layer 2 and Layer 3 tunneling protocols, such as generic routing encapsulation (GRE), virtual LAN (VLAN), virtual extensible LAN (VXLAN), secure socket tunneling protocol (SSTP), OpenVPN, layer 2 tunneling protocol (L2TP), IPsec, etc. These protocols may create a secure, logical link that allows data to be transmitted securely and efficiently between endpoints. In some embodiments, tunnels may be used to facilitate the segregation and management of different types of traffic to allow for the delivery of multiple services over a single infrastructure. For example, a tunnel may be used to encapsulate and transport service flows for high-speed data, voice, and video services so that each type of traffic is appropriately managed and prioritized according to its quality of service (QoS) requirements. For ease of reference, some of the examples below are described with reference to GRE tunnels. However, nothing in this application should be used to limit the claims to GRE tunnels unless expressly recited as such in the claims.

Figure 1B:
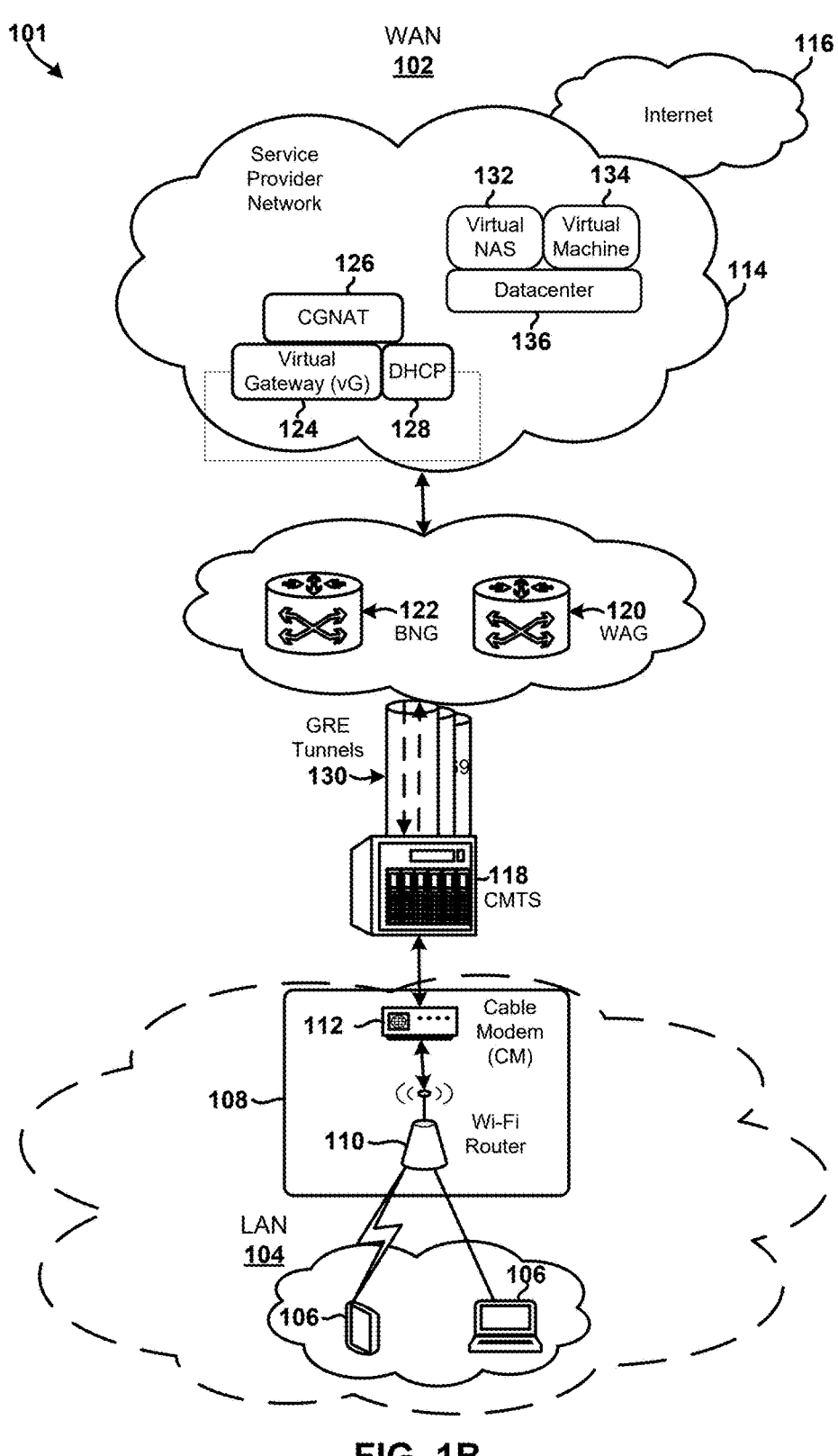

FIGS. 1A and 1B illustrate simplified examples of networks 100, 101 suitable for implementing various embodiments. In particular, the illustrations in FIGS. 1A and 1B are high-level representations of networks that depict various components and their interactions at different levels of abstraction. They aim to provide an overview of the network architecture, including key elements such as the CPE 108, service provider network 114, and relevant connectivity paths. These diagrams are not intended to detail every specific connection or physical layout but to offer a conceptual understanding of the networks' functional components and their relationships.

With reference to FIGS. 1A and 1B, the network configuration may include a wide area network (WAN) 102 and a local area network (LAN) 104. Within the LAN, user equipment (UE) 106 devices connect to customer premise equipment (CPE) 108 via wired and/or wireless communication links.

The CPE 108 may allow UE 106 devices within the LAN 104 to connect to the WAN 102 and, ultimately, the Internet 116. The CPE 108 may include a Wi-Fi router 110 and a cable modem (CM) 112 that facilitates connectivity with a service provider network 114 in the WAN 102 to allow the UE 106 devices to exchange information with the Internet 116. The CPE 108 may include LAN ports (e.g., ports FE0-FE3, etc.) and a LAN interface for communicating with the UE devices within the local network. The CPE 108 may include a WAN port (e.g., port FE4, etc.) and a WAN interface that allows the UE 106 devices to communicate with devices outside of the local network. In various embodiments, the CPE 108 may be, or may include, a passive optical network (PON), a D4.0/D3.1 residential embedded multimedia terminal adapter (eMTA), a D4.0/D3.1 small and medium business (SMB) eMTA, an advanced wireless gateway, or a $\frac{1}{10}$ G ethernet passive optical network (EPON) optical network unit (ONU), cable modem, digital subscriber line modem, router, switch, firewall, packet filter, wireless access point, and/or a residential gateway (e.g., BRG, etc.) that provide network connectivity to home or small office network.

The network 100, 101 may also include a service provider's network access gateway. In the example illustrated in FIG. 1B, the network access gateway is a BNG 122, which terminates the subscriber's traffic, routes, and manages the traffic through the service provider's network. It may connect to a remote authentication dial-in user service (RADIUS) server that provides authentication, authorization, and accounting services. In some embodiments, the network access gateway is a WAG 120, which may provide Wi-Fi access from a residential or small-medium business Wi-Fi network. The WAG 120 may be a customized BNG to provide Internet access and traffic speed boost service to mobile subscribers inside and outside the home network.

The network 100, 101 may also include a cable modem termination system (CMTS) 118 running the DOCSIS protocol (e.g., PHY and MAC layer between the CMTS 118 and CM 112, management of the CMs 112, etc.) to the service provider network 114 and connects the Wi-Fi router 110 to a BNG 122 and/or WAG 120 within the WAN 102. In some embodiments, the WAG 120 may function independently or may be integrated within a BNG 122 or a virtual gateway (vG) 124, which may be components provided by the service provider to manage network traffic and services. The BNG 122 may be integrated with the WAG 120 or function independently. The BNG 122 may include, for example, a carrier-grade network address translation (CGNAT) 126 component, a dynamic host configuration protocol (DHCP) 128 component, and other network management components such as policy and subscriber management systems. Communication within this network 100, 101 may be facilitated or supported by one or more generic routing encapsulation (GRE) tunnels 130, LAN links, Virtual Extensible LAN (VXLAN) links, and other communication pathways. In some embodiments, networks 100 and 101 may include one or more DOCSIS paths, each including one or more GRE paths and LAN paths, which manage and prioritize network traffic according to quality of service (QOS) traffic parameters defined for each flow.

Network 100 and 101 may also include a CMTS 118 that manages the DOCSIS protocol (PHY and MAC layers) between the CMTS 118 and the cable modem (CM) 112, including the management of the CMs. In some embodiments, the CMTS 118 may connect the Wi-Fi router 110 to a WAG 120 within the WAN 102. In some embodiments, the WAG 120 may function independently or may be integrated within a BNG 122 or a virtual gateway (vG) 124, which may be components provided by the service provider to manage network traffic and services. The BNG 122 may include, for example, a carrier-grade network address translation (CG-NAT) 126 component, a dynamic host configuration protocol (DHCP) 128 component, and other network management components such as policy and subscriber management systems. Communication within this network 100, 101 may be facilitated or supported by one or more tunnels 130, LAN links, Virtual Extensible LAN (VXLAN) links, and other communication pathways. In some embodiments, the network 100, 101 may include one or more DOCSIS paths each including one or more GRE paths and LAN paths, which manage and prioritize network traffic according to quality of service (QoS) traffic parameters defined for each flow.

It should be understood that FIGS. 1A and 1B do not expressly illustrate the DOCSIS paths as including GRE paths and LAN paths because they are a high-level representation of the networks that provide an overview of the network architectures, including key elements such as the CPE 108, service provider network 114, and relevant connectivity paths. To focus the discussion on the most relevant features, FIGS. 1A and 1B do not detail every specific connection or physical layout and are included to provide a high-level conceptual understanding of the network's functional components and their relationships.

In some embodiments, the Wi-Fi router 110 may be part of a bridged residential gateway (BRG) distributing CPE functions such as DHCP, NAT, and firewall between the BRG in the LAN 104 and the BNG 122 or vG 124 in the WAN 102. Unlike related architectures that localize DHCP server functionality within the LAN via a CPE modem/router, this network configuration deploys the DHCP 128 within the WAN 102 to allow the CPE 108 to function primarily as a connectivity facilitator and enhance UE 106 access to resources and information on the WAN 102.

The BNG 122 component may be configured to support communications with the CPE 108 via a GRE tunnel 130 and may establish a logical subscriber link (LSL) between the Wi-Fi router 110 and the WAG 120 for seamless service integration and management.

The CM 112 may operate as a network bridge that facilitates bidirectional data communications via radio frequency channels within a hybrid fiber-coaxial (HFC) and/or distributed access architecture (DAA) and/or radio frequency over glass (RFoG) infrastructure. The CMTS 118 may be located within a headend or hubsite and configured to enable high-speed communications between the CM 112 and other components within the service provider network 114, which provides consumer access to the Internet 116 and IP services over broadband connections.

In some embodiments, UE 106 communications may be transmitted over the GRE tunnels 130 via an extended LAN, with the DOCSIS/CMTS path serving as the primary conduit for connecting to the residential, home network, or LAN 104. The GRE tunnels 130 terminate at the WAN port of the Wi-Fi router 110. Thus, it should be understood that the GRE tunnel traffic does not extend directly to the UE 106. This network configuration may be important in shaping, policing, and prioritizing traffic according to QoS traffic parameters defined for a DOCSIS service flow.

The CGNAT 126 component may be configured to translate private-to-private and private-to-public IP addresses to allow multiple customer networks to share a common public IP address by translating the private IP address of the UE into public IP addresses.

In some embodiments, the DHCP 128 component may operate as an independent platform or may be hosted by the BNG 122 (e.g., serving as a DHCP relay, etc.). The DHCP 128 may dynamically assign an IP address to each UE 106 device as part of a lease assignment process and forward network configuration parameters to the UE 106 via the BRG or Wi-Fi router 110. The UE 106 device may request a lease renewal or extension after nearing the halfway mark of the lease period. The DHCP 128 may respond to the request by potentially reassigning the same or a different IP address.

The network 100, 101 may also include a virtual machine 132 component, a virtual network-attached storage (NAS) 134 component, a datacenter 136 component, etc., which may provide commodity hardware and a secure computing infrastructure for hosting the BNG 122 or vG 124 components. These components may be used for hosting specialized services available to the customer as an extension of their home LAN 104.

Figure 2A:
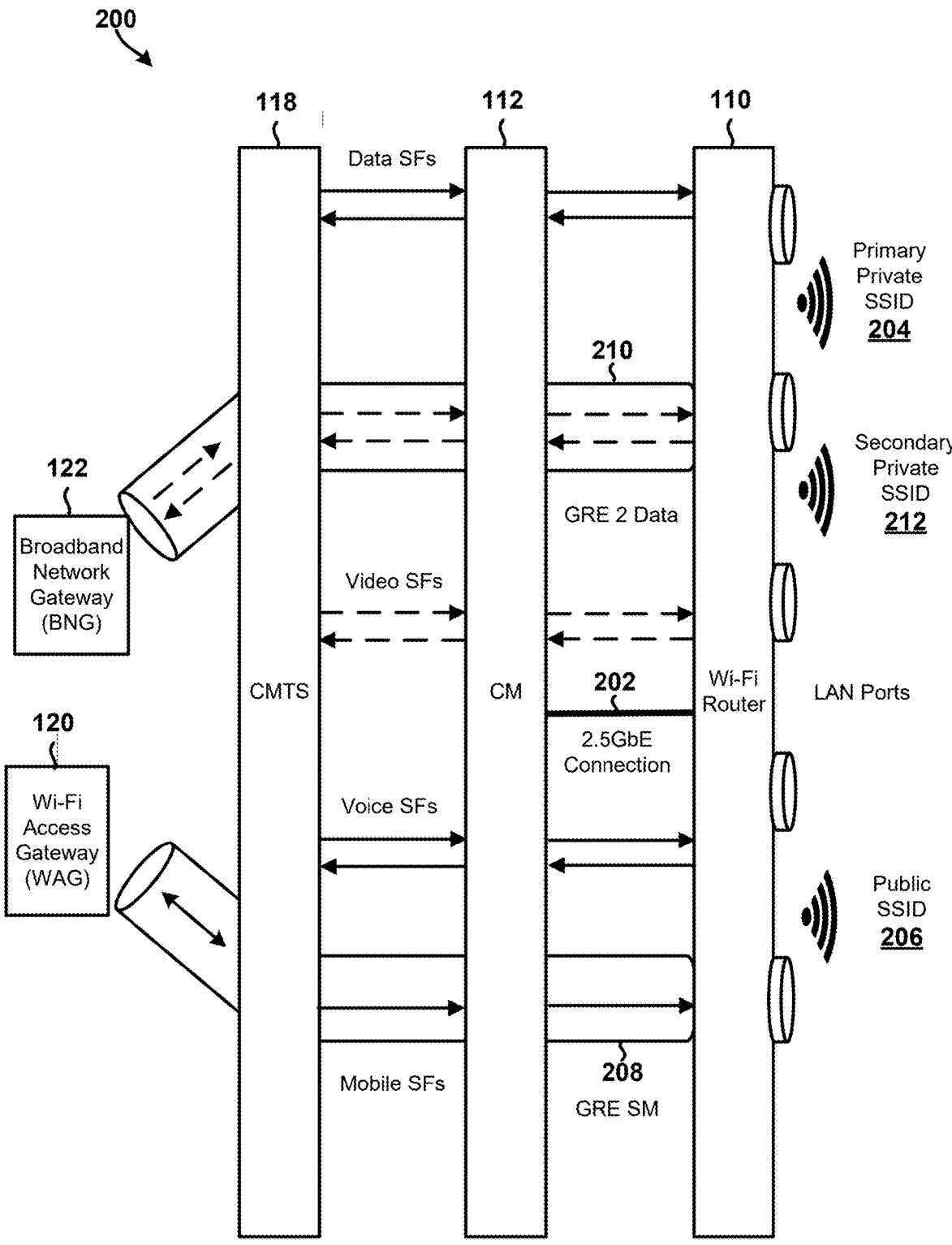
FIGS. 2A and 2B are component block diagrams illustrating a network system configuration for delivering multiple service lines/flows through single or multiple modems to one or more Wi-Fi routers in accordance with some embodiments.
Figure 2B:
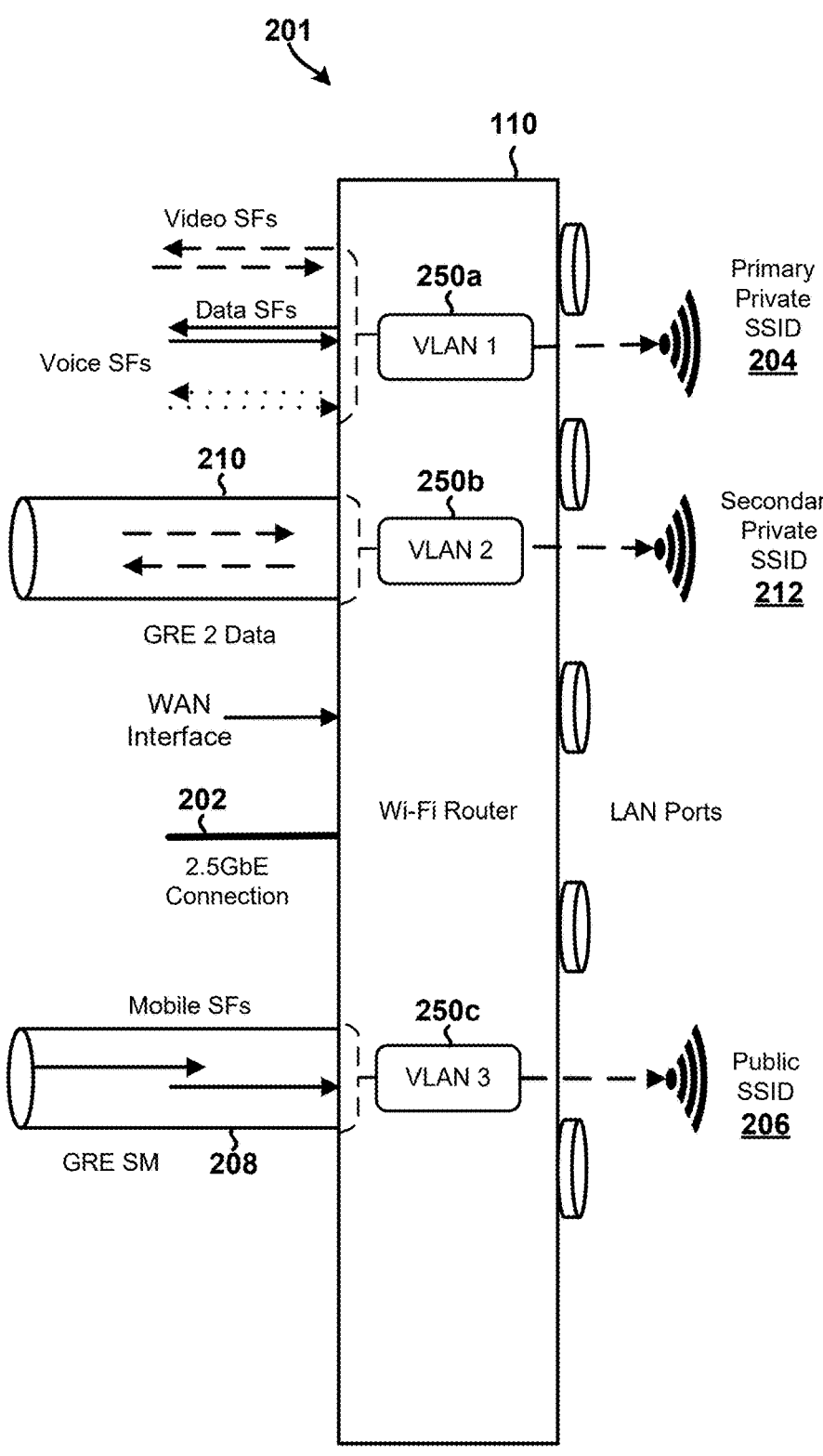

FIGS. 2A and 2B illustrate components in a system 200 configured to implement a single modem to single wi-fi router configuration in accordance with some embodiments. With reference to FIGS. 2A and 2B, the system 200 includes a WAG 120, BNG 122, CMTS 118, CM 112, and Wi-Fi router 110.

The system 200 may be configured to perform connectivity setup operations that include linking a DOCSIS 4.0 or 3.1 cable modem (CM 112) directly to a single Wi-Fi router using a high-capacity 10 G/2.5 Gbps Ethernet port. This arrangement ensures robust transmission capabilities for bandwidth-intensive applications, making it ideal for delivering primary services such as high-speed data, voice, and video to residential or SMB users.

The CM 112 may be a DOCSIS 4.0 or 3.1 compatible device that is connected to the Wi-Fi Router 110 using a 10 G/2.5 Gbps Ethernet port connection 202. The Ethernet port connection 202 may be a high-capacity connection with robust transmission capabilities for bandwidth-intensive applications and is otherwise suitable for delivering primary services (e.g., high-speed data, voice, video, etc.) to residential or SMB users.

The Wi-Fi Router 110 may be configured with multiple service set identifiers (SSIDs) to manage distinct service flows, such as the illustrated Primary Private SSID 204 and Public SSID 206. The Primary Private SSID 204 may be dedicated to primary services, such as high-speed data, voice, and video, to ensure that these services receive prioritized network resources. The Public SSID 206 may be used to provide additional or guest access such as mobile services for the service operator's mobile subscribers.

The system 200 may use GRE tunnels 208, 210 to further segregate and manage service flows. In the illustrated example, the system 200 includes a mobile GRE tunnel (GRE SM) 208 that directs mobile service flows from the WAG 120 in the service provider network 114 to the Public SSID 206 for mobile connectivity for users outside their primary location. The system 100 also includes a high-speed data GRE tunnel (GRE 2) 210 that manages an additional high-speed data service flow (SF), such as by segregating the traffic to the Secondary Private SSID 212 so that high-demand uses do not interfere with primary service delivery.

FIG. 2B illustrates the logical relationships between the virtual local area networks (VLANs) 250a-250c, the Wi-Fi router 110, and the other components in the system 100. In some embodiments, the Wi-Fi router 110 or CPE 108 may be configured to create one or more VLAN tags on the CPE 108. Each VLAN tag may be associated with one or more service set identifiers (SSIDs) and/or may be used to segregate multiple service flows.

With reference to FIG. 2B, high-speed data, voice, and video service flows may be provisioned and delivered through VLAN 1 250a to WiFi Router 110 associated with the Primary Private SSID 204. The GRE 2 Tunnel 210 may include a secondary high-speed data service flow, segregating traffic by connecting one endpoint to VLAN 2 250b associated with the Secondary Private SSID 212 of the Wi-Fi Router 110. The mobile service flow tunnel 212 may include additional service flows, segregating traffic by connecting one endpoint to VLAN 3 250c associated with the Public SSID 206 of the Wi-Fi Router 110.

Figure 3:
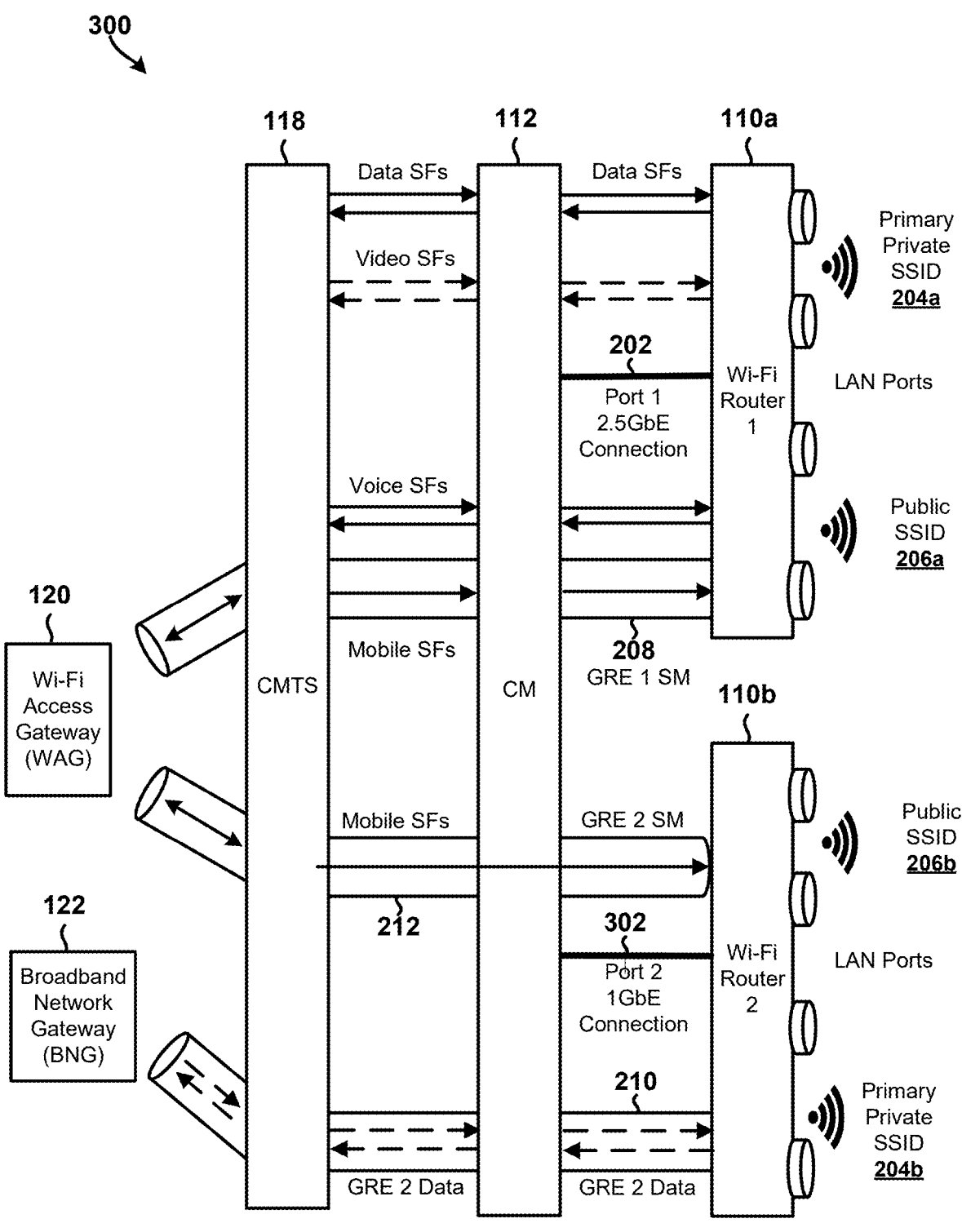
FIGS. 3 and 4 are component block diagrams illustrating different network system configurations for delivering multiple service lines/flows through single or multiple modems to one or more Wi-Fi routers in accordance with some embodiments.

FIG. 3 illustrates components in a system 300 configured to implement a single modem to multiple Wi-Fi router configuration in accordance with some embodiments. In the example illustrated in FIG. 3, a single D4.0/D3.1 cable modem (i.e., CM 112) is connected to two distinct Wi-Fi routers 110a and 110b via separate Ethernet ports 202, 302, which may be 2.5 GbE and 1 GbE ports in D3.1 eMTA or two 10 GbE ports or one 10 GbE port and 1 GbE port in D4.0 eMTA. Ethernet Port 1 202 connects CM 112 to a first Wi-Fi Router 110a, and Ethernet Port 2 302 connects CM 112 to a second Wi-Fi Router 110b. The CM 112 may be located at a single location, while the routers 110a and 110b may be located at the same or different geographic locations. In addition, system 300 may include VLANs 1-4 (not illustrated separately in FIG. 3).

With reference to FIG. 3, some embodiments may implement and use system 300 to efficiently manage the delivery of service flows. High-speed data, voice, and video services may be provisioned and delivered from Wi-Fi Access Gateway (WAG) 120 at the service provider network back-office to Wi-Fi Router 110a through VLAN 1, associated with Primary Private SSID 204a. The GRE SM Tunnel 208 may deliver a mobile service flow from WAG 120 to VLAN 2, associated with Public SSID 206a of Wi-Fi Router 110a . The GRE 2 Tunnel 210 may deliver a secondary high-speed data service flow, segregating this traffic by connecting WAG 120 to VLAN 3, associated with Private Primary SSID 204b of Wi-Fi Router 110b. The mobile service flow tunnel 212 may deliver another mobile service flow from WAG 120 to VLAN 4, associated with Public SSID 206b of Wi-Fi Router 110b.

As mentioned above, CM 112 may be located at a single location, while routers 110a and 110b may be located at the same or different geographic locations. Routers 110a and 110b may be considered as being located at the same location if they are in the same house, office, or multi-dwelling unit (MDU) or if the distance between the routers 110a and 110b or the distance between each router 110a, 110b, and CM 112 is less than approximately 300 feet (or 600 feet, etc.). Routers 110a and 110b may be considered as being located at different geographic locations when they are situated in separate houses, offices, or MDUs, if the distance between the routers 110a and 110b or the distance between each router 110a, 110b, and CM 112 exceeds 300 feet (or 600 feet, etc.), if they are connected to the CM 112 via a WAN rather than a LAN, etc.

Figure 4:
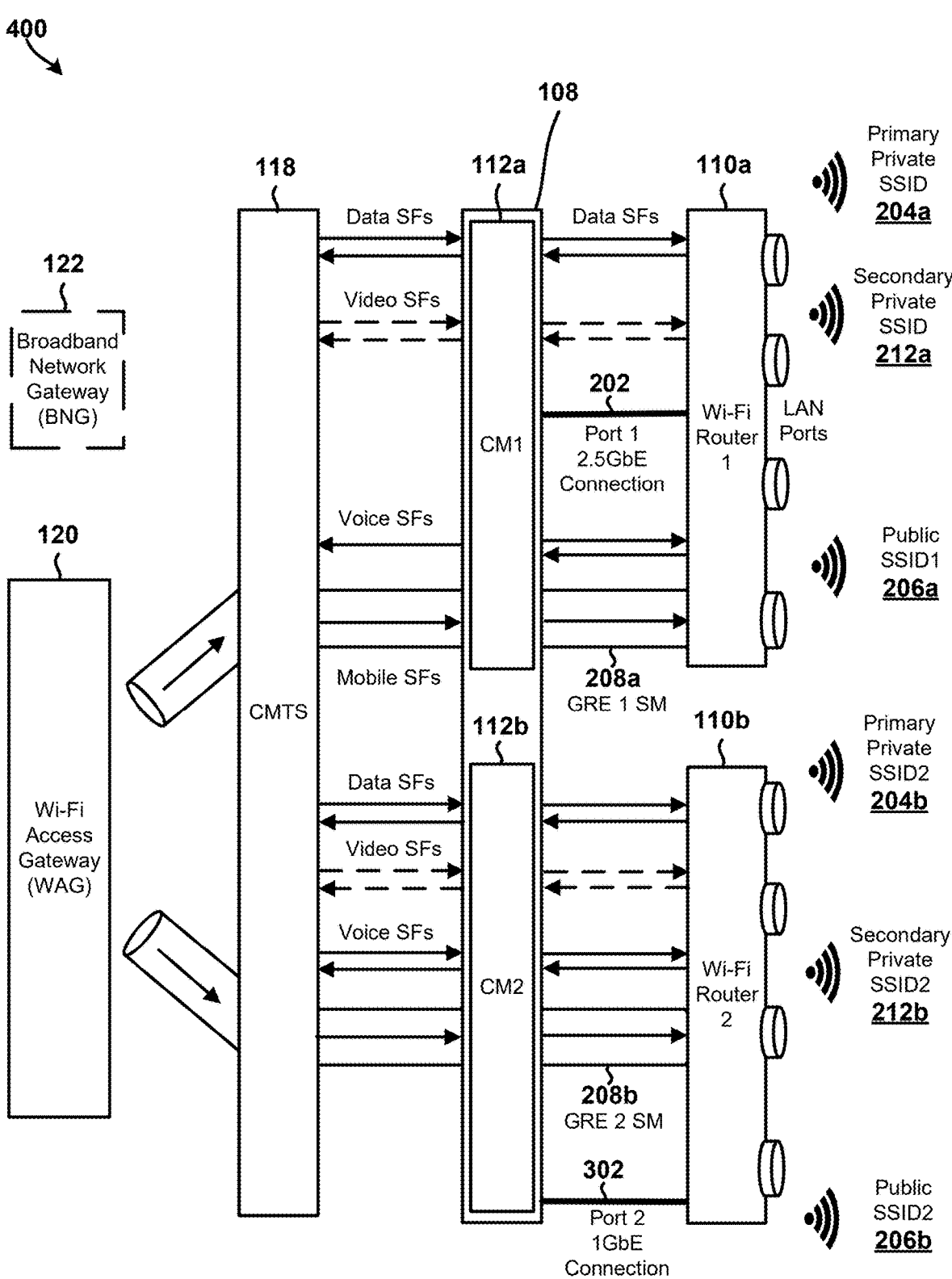

FIG. 4 illustrates components in system 400 configured for multiple modem deployment within a single CPE device 108 in accordance with some embodiments. In particular, the system 400 illustrated in FIG. 4 is an advanced network setup in which dual modems enhance service delivery redundancy and network resource utilization to provide robust high-speed connectivity and improved service quality for both residential and mobile users within the service provider network.

In the example illustrated in FIG. 4, there are two cable modems (i.e., CM1 112a and CM2 112b) connected via distinct Ethernet ports (i.e., Port 1 202 and Port 2 302), to Wi-Fi Routers 1 (110a) and 2 (110b) respectively, each supporting connections 202, 302. The cable modems 112a, 112b may distribute high-speed data, voice, and video services. CM1 112a may provision these services through VLAN 1 (not illustrated) and VLAN 2 (not illustrated), associated with the Primary Private SSID 204a and Secondary Private SSID 212a on Wi-Fi Router 110a. CM2 112b may provide services through VLAN 3 (not illustrated) and VLAN 4 (not illustrated) associated with Public SSID 206b and Secondary Private SSID 212b on Wi-Fi Router 110b.

System 400 incorporates two Layer 3 GRE tunnels 208a and 208b for enhanced service flow management. GRE tunnel 208a from CM1 112a may support continuous mobile service connectivity by encapsulating mobile service flows, with one endpoint at the WAG 120 in the service provider network back-office and traffic directed to VLAN 2, associated with the Secondary Private SSID 212a on Wi-Fi Router 110a. Similarly, GRE tunnel 208b from CM2 112b routes secondary mobile service flows, with one endpoint at WAG 120 and another linking to VLAN 4 associated with Public SSID 206b on Wi-Fi Router 110b. This setup provides additional flexibility and capacity for handling mobile traffic, ensuring robust service continuity across different network segments.

Figure 5:
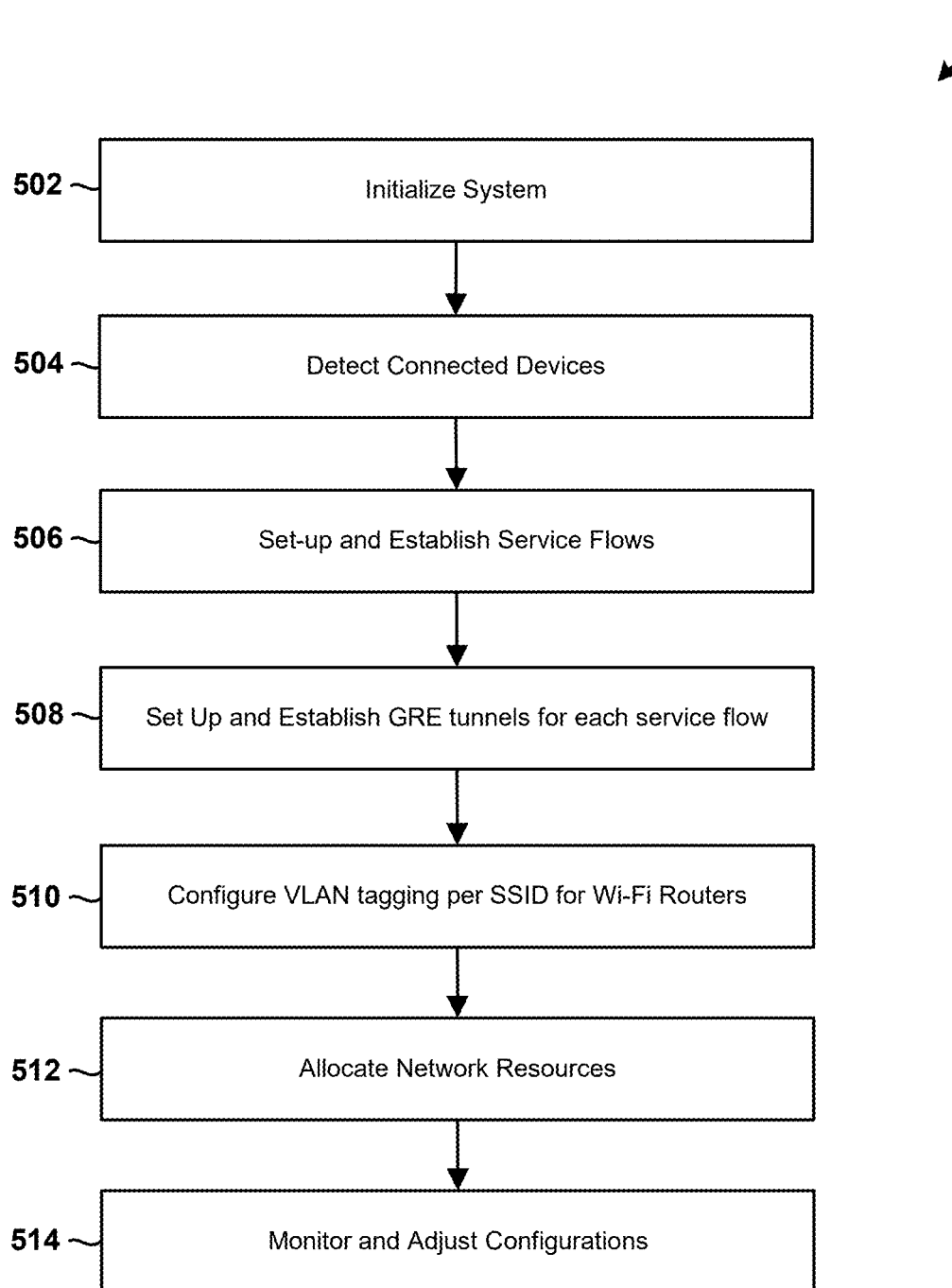
FIGS. 5-10 are flow diagrams illustrating methods of providing multiple service flows to multiple customers through a single CPE device in accordance with various embodiments.

FIG. 5 is a process flow diagram illustrating an example method 500 of providing multiple service flows in accordance with some embodiments. With reference to FIGS. 1-5, the method 500 may be performed in a computing device by processing system encompassing one or more processors, components or subsystems (e.g., CPE 108, etc.) discussed in this application. Means for performing the functions of the operations in the method 500 may include a processing system including one or more of the processors and/or other components described herein. Further, one or more processors of a processing system may be configured with software or firmware to perform some or all of the operations of the method 500. In order to encompass the alternative configurations enabled in various embodiments, the hardware implementing any or all of the method 500 is referred to herein as a "processing system."

It should be understood that method 500 may be executed in various network configurations, including those with only a WAG 120, only a BNG 122, both a WAG 120 and a BNG 122, or any combination thereof. Furthermore, references to the WAG 120 throughout this description should be interpreted to also encompass the BNG 122, and vice versa. In some embodiments, the BNG 122 and WAG 120 may collaborate to manage and route service flows, with the BNG 122 overseeing broader network management tasks and the WAG 120 focusing on wireless access. In other embodiments, the BNG 122 and WAG 120 may function independently, each addressing specific aspects of network traffic and service delivery.

With reference to FIG. 5, in block 502, the processing system may initialize the network system on a single CPE device. In some embodiments, these operations may include loading system configurations for available CPE devices and identifying their types and capabilities. The single CPE device may include both the modem and the Wi-Fi routers, as illustrated in FIG. 1. The CPE device may include a D4.0/D3.1 residential eMTA, D4.0/D3.1 SMB eMTA, advanced wireless gateway (AWG), or a ⅒ G EPON ONU.

In block 504, the processing system may identify and connect to network devices to ensure efficient communication and data flow within the network. The processing system may actively scan for and detect Wi-Fi routers and other essential network devices, and establish Ethernet connections using high-capacity ports (e.g., 10 G/2.5 Gbps). In some embodiments the detected connected network devices include at least one Wi-Fi router.

In block 506, the processing system may configure and reserve resources, and admit the service flows from the CMTS 118 to the CM 112. The CMTS 118 may allocate and admit the requested service flows to the CM 112. Then, the processing system may set up and configure GRE tunnels from the BNG 122 and WAG 120 to the Wi-Fi router 110. The Wi-Fi router 110 may then tag each VLAN to the correct SSID. For example, the processing system may assign VLAN IDs based on the type of service (e.g., primary services, secondary services), adjust VLAN settings on the CPE to segregate data traffic, etc. In some embodiments, each VLAN may be associated with a different service line/flow, including primary services and secondary services. Each VLAN may be configured to segregate data traffic for its associated service line/flow in some embodiments.

In block 508, the processing system (e.g., in the CPE, etc.) may initiate the setup of GRE tunnels for each service flow by, for example, signaling the BNG 122 or the WAG 120. The processing system may send configuration requests or commands to the BNG or WAG to establish the GRE tunnels from the BNG or WAG to the Wi-Fi router 110 so that each GRE tunnel corresponds to a different VLAN. For example, the processing system may instruct the BNG or WAG to configure a first GRE tunnel to encapsulate mobile service flows to an SSID associated with a first VLAN for mobile services, a second GRE tunnel to encapsulate high-speed data service flows to a Private Secondary SSID associated with a second VLAN for secondary high-speed data services, etc.

In block 510, the processing system may configure the VLAN IDs and assign them to specific SSIDs for Wi-Fi router(s). When VLAN tagging is configured per SSID, all the traffic from the wireless user UE 106 associated to that SSID, is tagged with the VLAN ID. In addition, multiple SSIDs can be configured to use the same VLAN tag. The assigned SSIDs may include at least a primary private SSID for essential services and a public SSID for guest access. For example, the processing system may map primary and secondary services to specific SSIDs, which may include configuring a primary private SSID for essential services (e.g., high-speed data, voice, and video, etc.) and setting up public and secondary private SSIDs for guest access and secondary services.

In block 512, the processing system may allocate network resources. Network resources may be allocated at different times, depending on the specific requirements of the network components. For example, network resources for CM service flows may be allocated independently in blocks 506 and 508. The processing system may dynamically allocate bandwidth and prioritize network traffic based on service requirements and customer profiles, implementing QoS parameters for managing traffic flows. In some embodiments, the processing system may dynamically allocate network resources across multiple VLANs based on pre-defined QoS parameters to prioritize network traffic. In some embodiments, the allocation of resources for the connected Wi-Fi router may occur separately to ensure efficient management of both wired and wireless service flows.

In block 514, the processing system may monitor and adjust configurations. For example, the processing system may continuously monitor network performance and usage patterns and adjust network configurations in real time to improve service delivery and customer satisfaction. In some embodiments, the processing system may continuously monitor network performance and adjust the configurations of the VLANs and GRE tunnels in real-time to optimize service delivery and maintain customer satisfaction.

In some embodiments, the processing system may also log operational data regarding the network performance and customer service levels, perform regular network system maintenance (e.g., update software and firmware, etc.), and perform other cleanup and maintenance operations for the single CPE device.

Figure 6:
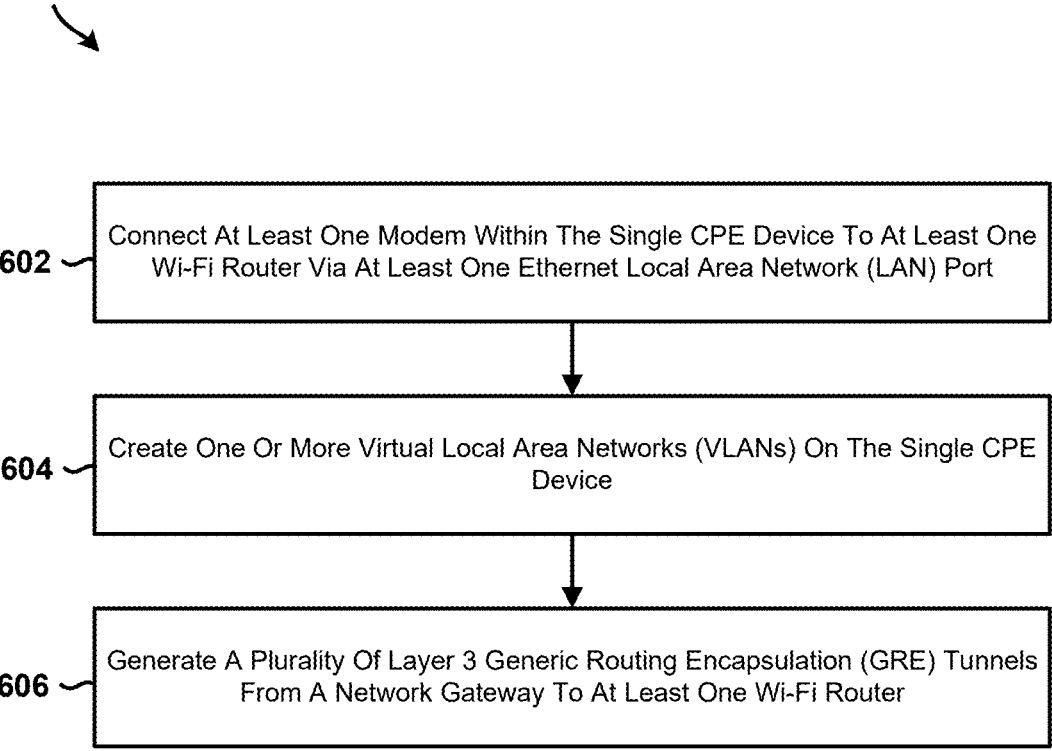

FIG. 6 is a process flow diagram illustrating an example method 600 of providing multiple service flows in accordance with some embodiments. With reference to FIGS. 1-6, method 600 may be performed in a computing device by a processing system encompassing one or more processors, components, or subsystems (e.g., CPE 108, etc.) discussed in this application.

In block 602, the processing system may connect at least one modem within the single CPE device to at least one Wi-Fi router via at least one Ethernet local area network (LAN) port. For example, the processing system may use a 10 G/2.5 Gbps Ethernet port to establish a high-speed connection between the modem and the Wi-Fi router. In various embodiments, "10 G/2.5 Gbps Ethernet port" may refer to a D3.1 eMTA with 2.5 GbE and 1 GbE ports or a D4.0 eMTA with either two 10 GbE ports or one 10 GbE port and one 1 GbE port.

In block 604, the processing system may create one or more virtual local area networks (VLANs) on the single CPE device. For example, in block 604, the processing system may assign VLAN IDs based on service types (e.g., primary services, secondary services), configure VLAN settings on the CPE to segregate traffic, and associate each VLAN tag with specific SSIDs tailored for different user profiles. Thus, in some embodiments, a CPE device may be configured to create one or more VLANs within the CPE device. Each VLAN tag may be associated with a specific Service Set Identifier (SSID). The VLANs may segregate service flows based on customer needs and service types.

In block 606, the processing system may generate a plurality of layer 3 generic routing encapsulation (GRE) tunnels from a network gateway to at least one Wi-Fi router. Each of the generated GRE tunnels may be associated with one or more SSIDs and may segregate service flows according to customer segments. For example, the processing system may establish GRE tunnels to encapsulate different service flows that provide traffic segregation and management for distinct customer segments.

In some embodiments, in block 606 the processing system may generate at least one tunnel from the network gateway to a first Wi-Fi router located at a first geographical location and at least one tunnel from the network gateway to a second Wi-Fi router located at a second geographical location. The second geographical location may be different from the first geographical location or may be the same as the first geographical location. Said another way, the processing system may provide multiple service flows to multiple customers at the same or different locations through a single CPE device.

The first and second Wi-Fi routers may be considered as being located at the same geographical location (e.g., the second geographical location may be the same as the first geographical location) if they are in the same house, office, or multi-dwelling unit (MDU) or if the distance between them does not meet or exceed a threshold value (e.g., is less than approximately 300 feet). The first and second Wi-Fi routers may be considered as being located at different geographical locations (i.e., the second geographical location may be different from the first geographical location) if they are situated in separate houses, offices, or MDUs, or if the distance between the first and second Wi-Fi routers or the distance between each router and the CM meets or exceeds the threshold value (e.g., is greater than approximately 300 feet).

Figure 7:
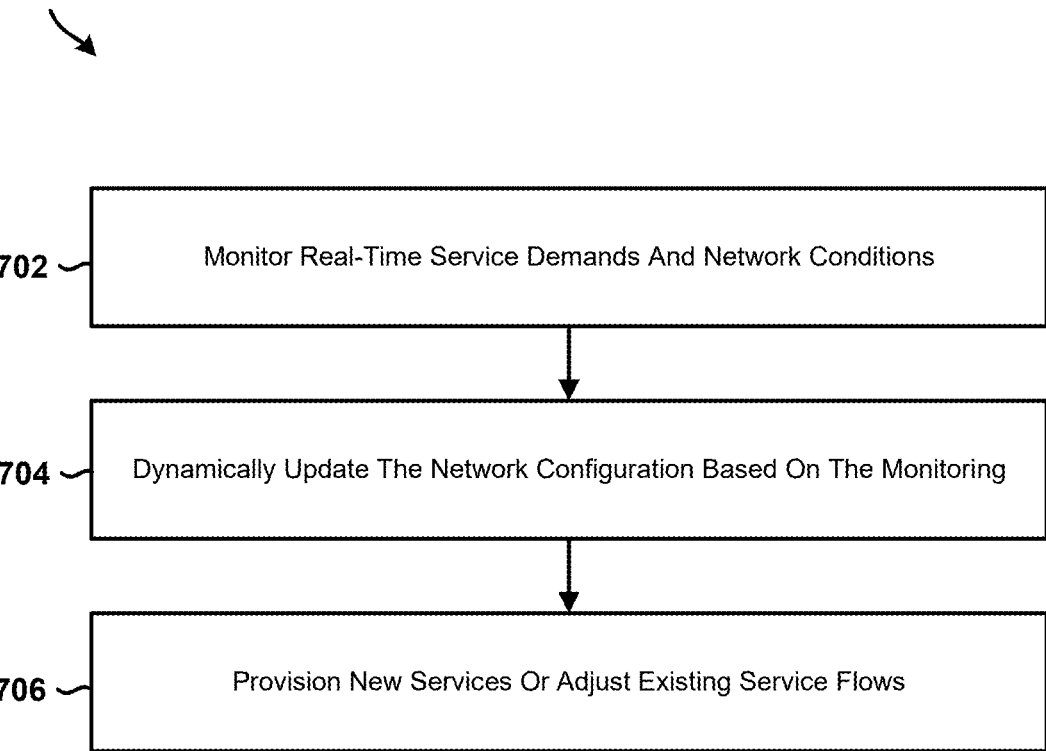

FIG. 7 is a process flow diagram illustrating an example method 700 of dynamically updating a network configuration in response to real-time service demands or network conditions to maintain service quality, in accordance with some embodiments. With reference to FIGS. 1-7, method 700 may be performed in a computing device by a processing system encompassing one or more processors, components, or subsystems (e.g., CPE 108, etc.) discussed in this application.

In block 702, the processing system may monitor real-time service demands and network conditions. For example, the processing system may use network analytics and monitoring tools to gather data on network usage, traffic patterns, and service performance metrics. These tools may include software applications and hardware devices capable of measuring and analyzing various parameters such as bandwidth consumption, latency, packet loss, and jitter. By continuously collecting and analyzing this data, the processing system may identify trends and patterns that indicate changes in service demands or potential network issues.

In block 704, the processing system may dynamically update the network configuration (to maintain service quality, etc.). In some embodiments, the processing system may update the network configuration in response to real-time service demands or network conditions so as to maintain service quality across a plurality of connected devices. In some embodiments, the processing system may provision new services, adjust service flows, or update GRE tunnel settings. In some embodiments, the processing system may update a modem configuration or a Wi-Fi router configuration. In some embodiments, the processing system may update at least one of the segregated service flows.

For example, in block 702, the processing system may allocate additional bandwidth to high-demand services, adjust Quality of Service (QoS) parameters, or modify VLAN tags and GRE tunnel settings to improve or optimize traffic flow. This dynamic updating process may include real-time adjustments based on the data collected in block 702. For example, if a particular service or customer segment experiences increased demand, the processing system may allocate more bandwidth to that service or segment to prevent congestion. The processing system may also prioritize critical services by adjusting QoS settings so that latency-sensitive applications adequately receive necessary resources. The system may also reconfigure VLAN tags to better segregate traffic or update GRE tunnel settings to improve the encapsulation and routing of different service flows.

In block 706, the processing system may provision new services or adjust existing service flows. For example, the processing system may enable or activate new service profiles, reconfigure existing VLAN tags, or update GRE tunnel settings to accommodate changes in user requirements or service agreements. Provisioning new services may include defining new VLANs and SSIDs, establishing new GRE tunnels, and configuring the necessary QoS parameters to support the new services. Adjusting existing service flows may include modifying the allocation of bandwidth among services, updating the priority of different traffic types, and reassigning VLAN tags and GRE tunnels to optimize performance.

Figure 8:
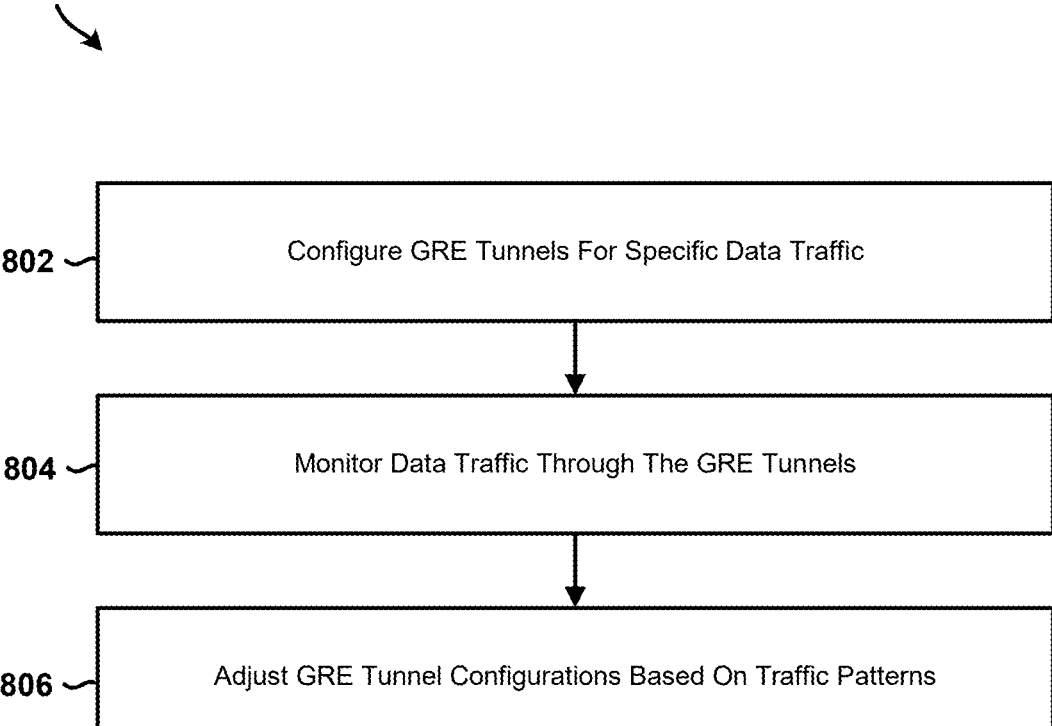

FIG. 8 is a process flow diagram illustrating an example method 800 of managing GRE tunnels to handle specific data traffic for separate customer segments, in accordance with some embodiments. With reference to FIGS. 1-8, method 800 may be performed in a computing device by a processing system encompassing one or more processors, components, or subsystems (e.g., CPE 108, etc.) discussed in this application.

In block 802, the processing system may configure GRE tunnels for specific data traffic. For example, the processing system may assign GRE tunnels to manage different types of service flows, such as high-speed data, voice, video, etc. These configuration operations may include defining the parameters for each GRE tunnel, such as the source and destination IP addresses, tunnel IDs, and QoS settings. Each tunnel may be optimized for the type of traffic it will carry. For example, a GRE tunnel designated for high-speed data may be configured with settings prioritizing bandwidth, while a tunnel for voice traffic may have settings that minimize latency and packet loss to ensure clear and uninterrupted communication.

In block 804, the processing system may monitor data traffic through the GRE tunnels. For example, the processing system may use network monitoring tools to track data flow, latency, and packet loss within each GRE tunnel. These tools may include software applications that analyze real-time data and provide insights into the performance of the tunnels. The processing system may collect metrics such as the volume of data being transmitted, the transmission speed, the number of packets dropped, and the average delay. This continuous monitoring may allow the system to promptly detect and respond to anomalies or performance issues.

In block 806, the processing system may adjust GRE tunnel configurations based on traffic patterns. For example, the processing system may modify tunnel parameters, reallocate bandwidth, or change traffic priorities to optimize performance for different customer segments. If monitoring data indicates that certain tunnels are experiencing congestion or suboptimal performance, the processing system may dynamically reconfigure the affected tunnels. This may include increasing the bandwidth allocated to a high-demand tunnel, adjusting the QoS settings to prioritize critical traffic, or rerouting traffic through alternative tunnels to balance the load.

Figure 9:
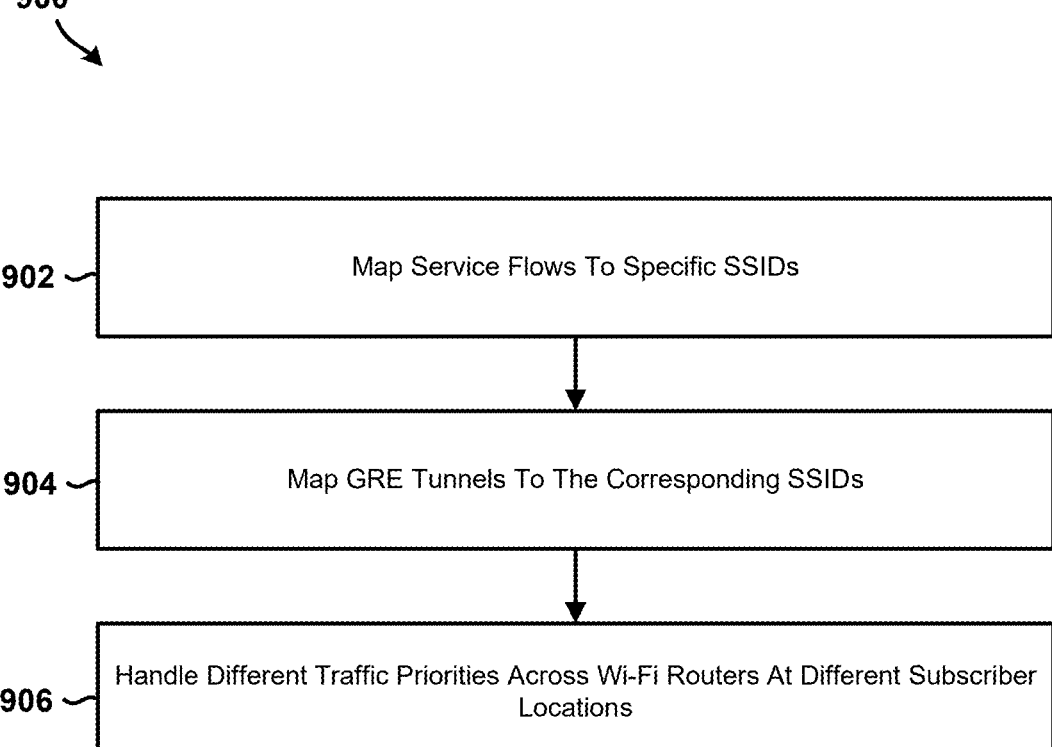

FIG. 9 is a process flow diagram illustrating an example method 900 of mapping service flows and GRE tunnels to SSIDs of Wi-Fi routers at different subscriber locations, in accordance with some embodiments. With reference to FIGS. 1-9, method 900 may be performed in a computing device by a processing system encompassing one or more processors, components, or subsystems discussed in this application.

In block 902, the processing system may map service flows to specific SSIDs. For example, the processing system may associate primary services with a primary private SSID and guest services with a public SSID on a Wi-Fi router. This may include configuring the Wi-Fi router to recognize different SSIDs for each type of service. Primary services, such as high-speed internet or voice, may be linked to a private SSID so that critical services receive the necessary security and bandwidth. Guest services, such as public internet access, may be assigned to a public SSID, which may have more restrictive access controls and lower priority to prevent interference with primary services.

In block 904, the processing system may map GRE tunnels to the corresponding SSIDs. The GRE tunnels are terminated at the WAN port of the Wi-Fi router. The router's firmware may configure the VLAN tag for each specific SSID. For example, the processing system may configure GRE tunnels to route traffic to the appropriate SSID so that each service flow is delivered to the correct network segment. This may include setting up GRE tunnel endpoints that align with the SSID configurations. Each GRE tunnel may encapsulate data packets and direct them to the designated SSID, maintaining the separation of service flows. This configuration may help ensure that traffic for primary services is directed through a secure, high-priority tunnel, while guest traffic is routed through a different tunnel that matches its SSID and priority level.

In block 906, the processing system may handle different traffic priorities across Wi-Fi routers at different subscriber locations. For example, the processing system may implement traffic prioritization rules to manage service quality across multiple Wi-Fi routers, ensuring consistent performance for all connected devices. This may include configuring QoS settings on each Wi-Fi router to prioritize traffic based on the type of service and the associated SSID. For instance, traffic for primary services on a private SSID may be prioritized over guest services on a public SSID. The processing system may dynamically adjust these priorities based on real-time network conditions and user demands, ensuring that high-priority services maintain optimal performance even during peak usage.

Figure 10:
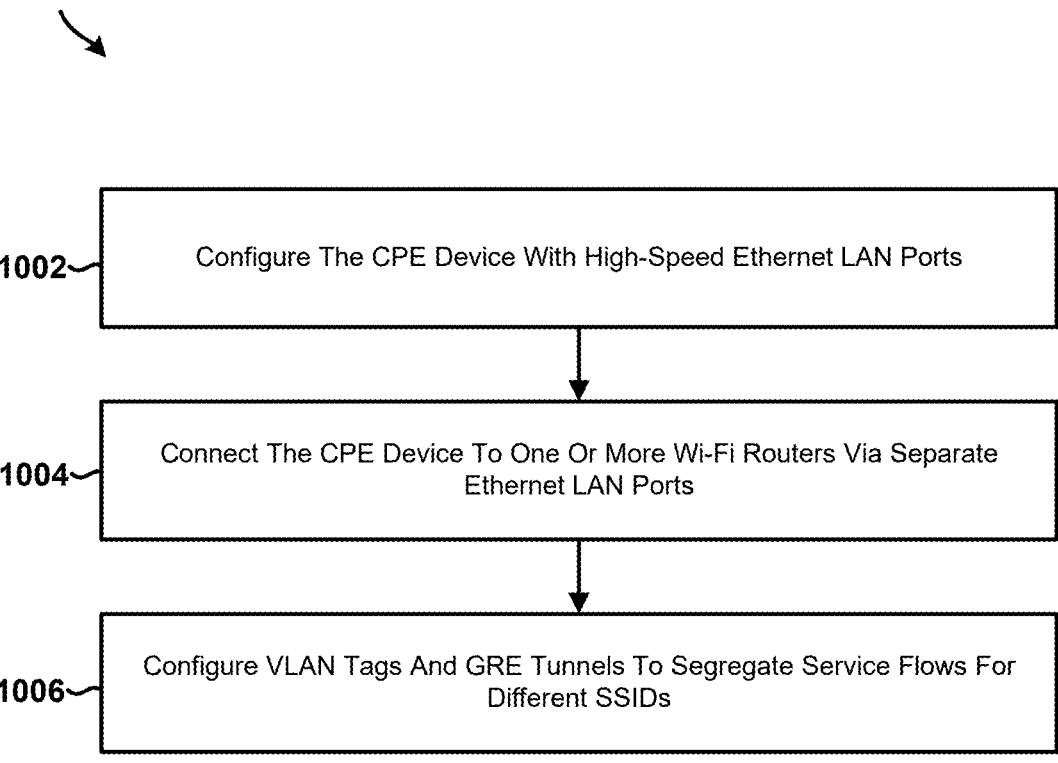

FIG. 10 is a process flow diagram illustrating an example method 1000 of configuring a CPE device to handle high-speed connections and multiple service flows, in accordance with some embodiments. With reference to FIGS. 1-10, method 1000 may be performed in a computing device by a processing system encompassing one or more processors, components, or subsystems discussed in this application.

In block 1002, the processing system may configure the CPE device with high-speed Ethernet LAN ports. For example, the processing system may ensure the CPE device includes 10 G/2.5 Gbps Ethernet ports. In a D3.1 eMTA, this may include 2.5 GbE and 1 GbE ports. In a D4.0 eMTA, this may include two 10GbE ports or one 10 GbE port and one 1 GbE port. These configurations may provide the necessary bandwidth and connectivity options to support high-speed data transfer and multiple service flows.

In block 1004, the processing system may connect the CPE device to two Wi-Fi routers via separate Ethernet LAN ports. For example, the processing system may use one Ethernet port to connect to a primary Wi-Fi router for essential services and another port to connect to a secondary router for additional or guest services. This setup may allow the primary Wi-Fi router to handle critical services via dedicated bandwidth and priority. The secondary router may manage additional services, such as guest internet access, without impacting the performance of the primary services.

In block 1006, the processing system may configure VLAN tags and GRE tunnels to segregate service flows for different SSIDs. For example, the processing system may set up VLAN tags for each service type and associate them with specific SSIDs. Each VLAN, identified by its tag, may be configured to handle a distinct type of service, such as high-speed data, voice, or video. The processing system may also configure GRE tunnels to manage and segregate traffic flow accordingly. GRE tunnels may encapsulate the service flows and direct them to the appropriate VLANs and SSIDs to maintain traffic separation and provide efficient data routing.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the other methods, and vice versa.

For the sake of clarity and ease of presentation, the methods herein (e.g., 500, 600, 700, 800, 900, 1000, etc.) are presented as separate embodiments and/or in a specific sequence. This sequential presentation is for illustrative purposes and does not imply that the steps must be performed in the order shown. It should be clear to those skilled in the art that various combinations or omissions of these methods, blocks, operations, etc., could be used to achieve a desired result or specific outcome. Further, the descriptions herein do not preclude the integration or adaptation of different embodiments of the methods, blocks, operations, etc., to produce a modified or alternative result or solution. The presentation of individual methods, blocks, operations, etc., should not be interpreted as sequential, mutually exclusive, limiting, or as being required unless expressly recited as such in the claims.

Figure 11:
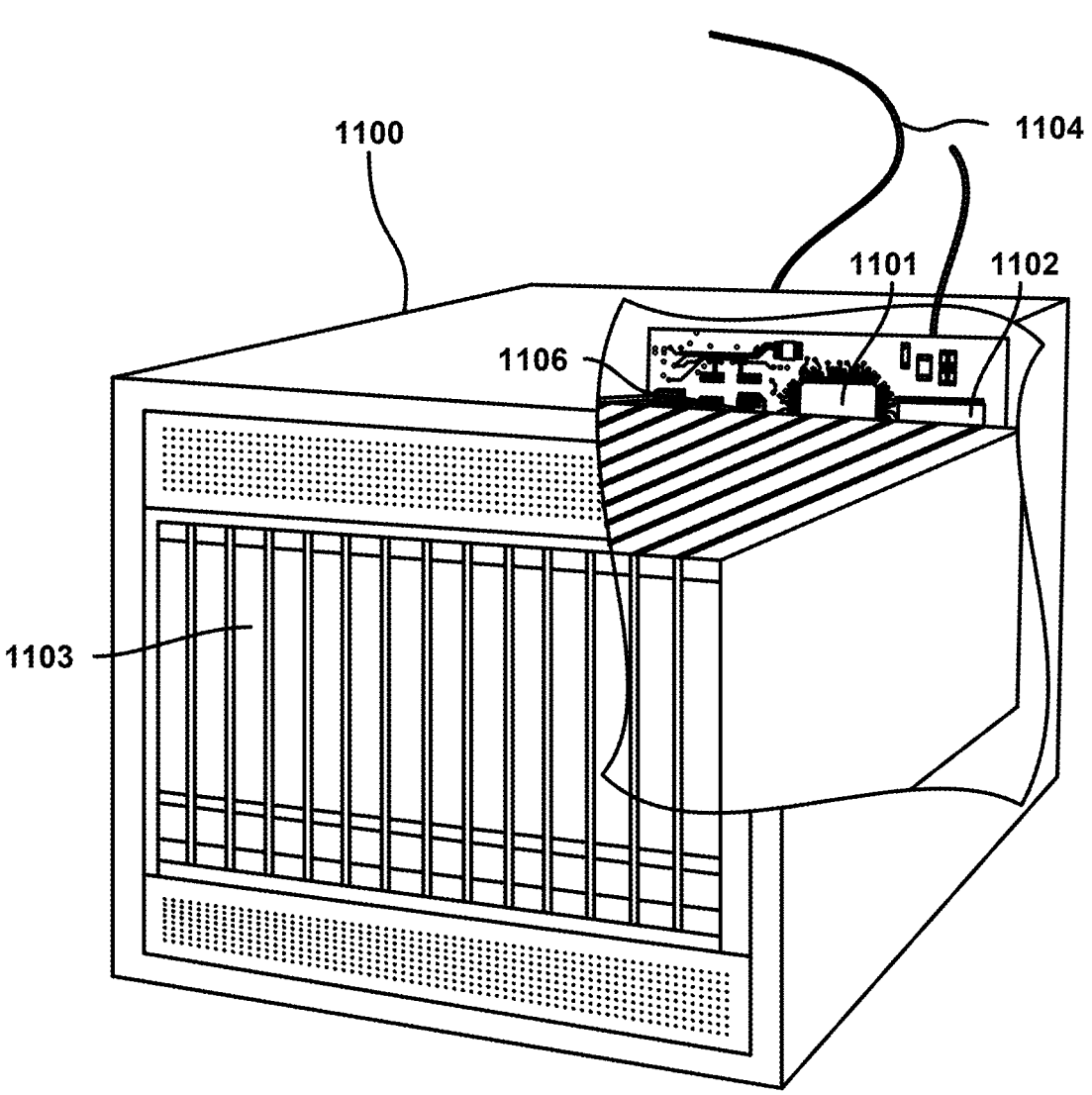
FIG. 11 is a component diagram of an example server suitable for implementing the various embodiments.

Various embodiments (including, but not limited to, embodiments discussed above with reference to FIGS. 1-11) may be implemented on any of a variety of commercially available computing devices, such as the server computing device 1100 illustrated in FIG. 11. Such a server device 1100 may include a processor 1101 coupled to volatile memory 1102 and a large capacity nonvolatile memory, such as a disk drive 1103. The server device 1100 may also include a floppy disc drive, USB, compact disc (CD) or DVD disc drive coupled to the processor 1101. The server device 1100 may also include network access ports 1106 coupled to the processor 1101 for establishing data connections with a network connection circuit 1104 and a communication network (e.g., IP network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing systems, multiple processors may be provided, such as one processor within the first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing system including a processor configured (e.g., with processor-executable instructions) to perform operations of the methods of the following implementation examples; the example methods discussed in the following paragraphs implemented by a computing system including means for performing functions of the methods of the following implementation examples; and the example methods discussed in the following paragraphs may be implemented as a non-transitory processor-readable storage medium having stored thereon processor-executable instructions configured to cause a processor of a computing system to perform the operations of the methods of the following implementation examples.

Example 1: A method of providing multiple service flows to multiple customers through a single customer premises equipment (CPE) device, including connecting at least one modem within the single CPE device to at least one Wi-Fi router via at least one Ethernet local area network (LAN) port, creating one or more virtual local area network (VLAN) tags on the single CPE device, in which each of the one or more VLAN tags segregates multiple service flows and is associated with one or more service set identifiers (SSIDs), and generating a plurality of tunnels from a network gateway to the at least one Wi-Fi router, in which each of the generated plurality of tunnels is associated with the one or more SSIDs and segregates service flows according to customer segments.

Example 2: The method of example 1, further including dynamically updating a network configuration in response to real-time service demands or network conditions so as to maintain service quality across a plurality of connected devices.

Example 3: The method of any of the examples 1 and 2, in which dynamically updating the network configuration further includes provisioning new services, adjusting service flows, or updating tunnel settings.

Example 4: The method of any of the examples 1-3, in which dynamically updating the network configuration includes dynamically updating a modem configuration or a Wi-Fi router configuration.

Example 5: The method of any of the examples 1-4, in which dynamically updating the network configuration includes updating at least one of the segregated service flows to accommodate changes in customer demands or network conditions.

Example 6: The method of any of the examples 1-5, in which each of the generated plurality of tunnels is a Layer 3 generic routing encapsulation (GRE) tunnel configured to manage specific data traffic designated to separate customer segments.

Example 7: The method of any of the examples 1-6, further including repeatedly monitoring and adjusting data flows through the VLAN tags and tunnels.

Example 8: The method of any of the examples 1-7, further including mapping the service flows and tunnels to the SSIDs of one or more different Wi-Fi routers.

Example 9: The method of any of the examples 1-8, further including mapping different service flows and tunnels with different traffic priorities to different Wi-Fi routers at different subscriber locations.

Example 10: The method of any of the examples 1-9, in which the network gateway includes at least one of a Wi-Fi access gateway (WAG) and a Broadband network gateway (BNG).

Example 11: The method of any of the examples 1-10, in which the CPE device includes at least one of a passive optical network (PON), a D4.0/D3.1 residential embedded multimedia terminal adapter (eMTA), a D4.0/D3.1 small and medium business (SMB) eMTA, a wireless gateway, or a 1/10 G Ethernet passive optical network (EPON) optical network unit (ONU).

Example 12: The method of any of the examples 1-11, further including connecting the CPE device to two or more Wi-Fi routers via separate Ethernet LAN ports configured to support various throughput capacities to allow for the delivery of separate sets of services through different VLANs associated with different SSIDs.

Example 13: The method of any of the examples 1-12, in which generating the plurality of tunnels from the network gateway to the at least one Wi-Fi router includes generating at least one tunnel from the network gateway to a first Wi-Fi router located at a first geographical location and generating at least one tunnel from the network gateway to a second Wi-Fi router located at a second geographical location, in which the second geographical location is different from the first geographical location.

Example 14: The method of any of the examples 1-12, in which generating the plurality of tunnels from the network gateway to the at least one Wi-Fi router includes generating at least one tunnel from the network gateway to a first Wi-Fi router located at a first geographical location and generating at least one tunnel from the network gateway to a second Wi-Fi router located at a second geographical location, in which the second geographical location is the same as the first geographical location.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of providing multiple service flows to multiple customers through a single customer premises equipment (CPE) device, comprising:

connecting at least one modem within the single CPE device to at least one Wi-Fi router via at least one Ethernet local area network (LAN) port;

creating one or more virtual local area network (VLAN) tags on the single CPE device, wherein each of the one or more VLAN tags segregates the multiple service flows and is associated with one or more service set identifiers (SSIDs); and generating a plurality of tunnels from a network gateway to the at least one Wi-Fi router, wherein each of the generated plurality of tunnels is associated with the one or more SSIDs and segregates the multiple service flows according to customer segments.

2. The method of claim 1, further comprising dynamically updating a network configuration in response to real-time service demands or network conditions so as to maintain service quality across a plurality of connected devices.

3. The method of claim 2, wherein dynamically updating the network configuration further comprises provisioning new services, adjusting the multiple service flows, or updating tunnel settings.

4. The method of claim 2, wherein dynamically updating the network configuration comprises dynamically updating a modem configuration or a Wi-Fi router configuration.

5. The method of claim 2, wherein dynamically updating the network configuration includes updating at least one of the segregated multiple service flows to accommodate changes in customer demands or network conditions.

6. The method of claim 1, wherein each of the generated plurality of tunnels is a Layer 3 generic routing encapsulation (GRE) tunnel configured to manage specific data traffic designated to separate customer segments.

7. The method of claim 1, further comprising repeatedly monitoring and adjusting data flows through the VLAN tags and tunnels.

8. The method of claim 1, further comprising mapping the multiple service flows and tunnels to the SSIDs of one or more different Wi-Fi routers.

9. The method of claim 1, further comprising mapping different service flows and tunnels with different traffic priorities to different Wi-Fi routers at different subscriber locations.

10. The method of claim 1, wherein the network gateway includes at least one of a Wi-Fi access gateway (WAG) and a Broadband network gateway (BNG).

11. The method of claim 1, wherein the CPE device comprises at least one of:

a passive optical network (PON);

a D4.0/D3.1 residential embedded multimedia terminal adapter (eMTA);

a D4.0/D3.1 small and medium business (SMB) eMTA;

a wireless gateway; or a $\frac{1}{10}$ G Ethernet passive optical network (EPON) optical network unit (ONU).

12. The method of claim 11, further comprising connecting the CPE device to two or more Wi-Fi routers via separate Ethernet LAN ports configured to support various throughput capacities to allow for the delivery of separate sets of services through different VLANs associated with different SSIDs.

13. The method of claim 1, wherein generating the plurality of tunnels from the network gateway to the at least one Wi-Fi router comprises:

generating at least one tunnel from the network gateway to a first Wi-Fi router located at a first geographical location; and generating at least one tunnel from the network gateway to a second Wi-Fi router located at a second geographical location, wherein the second geographical location is different from the first geographical location.

14. The method of claim 1, wherein generating the plurality of tunnels from the network gateway to the at least one Wi-Fi router comprises:

generating at least one tunnel from the network gateway to a first Wi-Fi router located at a first geographical location; and generating at least one tunnel from the network gateway to a second Wi-Fi router located at a second geographical location, wherein the second geographical location is the same as the first geographical location.

15. A customer premises equipment (CPE) device, comprising:

at least one modem; and a processing system coupled to the at least one modem and configured to:

connect at least one modem within the CPE device to at least one Wi-Fi router via at least one Ethernet local area network (LAN) port;

create one or more virtual local area network (VLAN) tags on the CPE device, wherein each of the one or more VLAN tags segregates multiple service flows and is associated with one or more service set identifiers (SSIDs); and generate a plurality of tunnels from a network gateway to the at least one Wi-Fi router, wherein each of the generated plurality of tunnels is associated with the one or more SSIDs and segregates the multiple service flows according to customer segments.

16. The CPE device of claim 15, wherein the processing system is further configured to dynamically update a network configuration in response to real-time service demands or network conditions so as to maintain service quality across a plurality of connected devices.

17. The CPE device of claim 16, wherein the processing system is configured to dynamically update the network configuration by provisioning new services, adjusting the multiple service flows, or updating tunnel settings.

18. The CPE device of claim 16, wherein the processing system is configured to dynamically update the network configuration by dynamically updating a modem configuration or a Wi-Fi router configuration.

19. The CPE device of claim 16, wherein the processing system is configured to dynamically update the network configuration by updating at least one of the segregated multiple service flows to accommodate changes in customer demands or network conditions.

20. The CPE device of claim 15, wherein each of the generated plurality of tunnels is a Layer 3 generic routing encapsulation (GRE) tunnel configured to manage specific data traffic designated to separate customer segments.

21. The CPE device of claim 15, wherein the processing system is further configured to repeatedly monitor and adjust data flows through the VLAN tags and tunnels.

22. The CPE device of claim 15, wherein the processing system is further configured to map the multiple service flows and tunnels to the SSIDs of one or more different Wi-Fi routers.

23. The CPE device of claim 15, wherein the processing system is further configured to map different service flows and tunnels with different traffic priorities to different Wi-Fi routers at different subscriber locations.

24. The CPE device of claim 15, wherein the network gateway includes at least one of a Wi-Fi access gateway (WAG) and a Broadband network gateway (BNG).

25. The CPE device of claim 15, further comprising at least one of:

a passive optical network (PON);

a D4.0/D3.1 residential embedded multimedia terminal adapter (eMTA);

a D4.0/D3.1 small and medium business (SMB) eMTA;

a wireless gateway; or a ¹⁄₁₀ G Ethernet passive optical network (EPON) optical network unit (ONU).

26. The CPE device of claim 25, wherein the processing system is further configured to connect the CPE device to two or more Wi-Fi routers via separate Ethernet LAN ports configured to support various throughput capacities to allow for the delivery of separate sets of services through different VLANs associated with different SSIDs.

27. The CPE device of claim 15, wherein the processing system is configured to generate the plurality of tunnels from the network gateway to the at least one Wi-Fi router by:

generating at least one tunnel from the network gateway to a first Wi-Fi router located at a first geographical location; and generating at least one tunnel from the network gateway to a second Wi-Fi router located at a second geographical location, wherein the second geographical location is different from the first geographical location.

28. The CPE device of claim 15, wherein the processing system is configured to generate the plurality of tunnels from the network gateway to the at least one Wi-Fi router by:

generating at least one tunnel from the network gateway to a first Wi-Fi router located at a first geographical location; and generating at least one tunnel from the network gateway to a second Wi-Fi router located at a second geographical location, wherein the second geographical location is the same as the first geographical location.

29. A non-transitory processor-readable medium having stored thereon processor-readable instructions configured to cause a processing device to perform operations for providing multiple service flows to multiple customers through a single customer premises equipment (CPE) device, the operations comprising:

connecting at least one modem within the single CPE device to at least one Wi-Fi router via at least one Ethernet local area network (LAN) port;

creating one or more virtual local area network (VLAN) tags on the single CPE device, wherein each of the one or more VLAN tags segregates the multiple service flows and is associated with one or more service set identifiers (SSIDs); and generating a plurality of tunnels from a network gateway to the at least one Wi-Fi router, wherein each of the generated plurality of tunnels is associated with the one or more SSIDs and segregates the multiple service flows according to customer segments.

30. The non-transitory processor-readable medium of claim 29, wherein the stored processor-readable instructions are configured to cause the processing device to perform operations further comprising dynamically updating a network configuration in response to real- time service demands or network conditions so as to maintain service quality across a plurality of connected devices.

31. The non-transitory processor-readable medium of claim 30, wherein the stored processor-readable instructions are configured to cause the processing device to perform operations such that dynamically updating the network configuration further comprises provisioning new services, adjusting the multiple service flows, or updating tunnel settings.

32. The non-transitory processor-readable medium of claim 30, wherein the stored processor-readable instructions are configured to cause the processing device to perform operations such that dynamically updating the network configuration comprises dynamically updating a modem configuration or a Wi-Fi router configuration.

33. The non-transitory processor-readable medium of claim 30, wherein the stored processor-readable instructions are configured to cause the processing device to perform operations such that dynamically updating the network configuration includes updating at least one of the segregated multiple service flows to accommodate changes in customer demands or network conditions.

34. The non-transitory processor-readable medium of claim 29, wherein the stored processor-readable instructions are configured to cause the processing device to perform operations such that each of the generated plurality of tunnels is a layer 3 generic routing encapsulation (GRE) tunnel configured to manage specific data traffic designated to separate customer segments.

35. The non-transitory processor-readable medium of claim 29, wherein the stored processor-readable instructions are configured to cause the processing device to perform operations further comprising repeatedly monitoring and adjusting data flows through the VLAN tags and tunnels.

36. The non-transitory processor-readable medium of claim 29, wherein the stored processor-readable instructions are configured to cause the processing device to perform operations further comprising mapping the multiple service flows and tunnels to the SSIDs of one or more different Wi-Fi routers.

37. The non-transitory processor-readable medium of claim 29, wherein the stored processor-readable instructions are configured to cause the processing device to perform operations further comprising mapping different service flows and tunnels with different traffic priorities to different Wi-Fi routers at different subscriber locations.

38. The non-transitory processor-readable medium of claim 29, wherein the network gateway includes at least one of a Wi-Fi access gateway (WAG) and a Broadband network gateway (BNG).

39. The non-transitory processor-readable medium of claim 29, wherein the CPE device comprises at least one of:
a passive optical network (PON);
a D4.0/D3.1 residential embedded multimedia terminal adapter (eMTA);
a D4.0/D3.1 small and medium business (SMB) eMTA;
a wireless gateway; or
a $\frac{1}{10}$ G Ethernet passive optical network (EPON) optical network unit (ONU).

40. The non-transitory processor-readable medium of claim 39, wherein the stored processor-readable instructions are configured to cause the processing device to perform operations further comprising connecting the CPE device to two or more Wi-Fi routers via separate Ethernet LAN ports configured to support various throughput capacities to allow for the delivery of separate sets of services through different VLANs associated with different SSIDs.

* * * * *